United States Patent
Lee et al.

(10) Patent No.: US 7,182,497 B2
(45) Date of Patent: Feb. 27, 2007

(54) ILLUMINATION UNIT USING LED AND IMAGE PROJECTING APPARATUS EMPLOYING THE SAME

(75) Inventors: Kye-hoon Lee, Suwon-si (KR); Young-chol Lee, Gunpo-si (KR); Won-yong Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 120 days.

(21) Appl. No.: 11/119,918

(22) Filed: May 3, 2005

(65) Prior Publication Data

US 2006/0067090 A1 Mar. 30, 2006

(30) Foreign Application Priority Data

Sep. 24, 2004 (KR) ............. 10-2004-0076902

(51) Int. Cl.
*F21V 8/00* (2006.01)
(52) U.S. Cl. .............. 362/555; 362/551; 362/237; 362/268
(58) Field of Classification Search ......... 362/600, 362/615, 551, 555, 237, 236, 268, 331
See application file for complete search history.

(56) References Cited

U.S. PATENT DOCUMENTS

| | | | |
|---|---|---|---|
| 4,935,665 A | | 6/1990 | Murata |
| 6,547,423 B2 | | 4/2003 | Marshall et al. |
| 6,948,836 B2 | * | 9/2005 | Ishida et al. ............. 362/516 |
| 7,040,767 B2 | * | 5/2006 | Lee et al. ............. 353/99 |
| 7,059,731 B2 | * | 6/2006 | Lee et al. ............. 353/99 |
| 7,097,334 B2 | * | 8/2006 | Ishida et al. ............. 362/516 |

FOREIGN PATENT DOCUMENTS

| | | |
|---|---|---|
| JP | 11-306833 A | 11/1999 |
| JP | 11-329038 A | 11/1999 |
| KR | 10-0422258 B1 | 2/2004 |

* cited by examiner

*Primary Examiner*—Laura K. Tso
(74) *Attorney, Agent, or Firm*—Sughrue Mion, PLLC

(57) ABSTRACT

An illumination unit is provided which includes a glass rod including a parabolic reflection surface, a light incident surface facing the parabolic reflection surface, a concave portion formed inwardly in the light incident surface at a position of a focal point of the parabolic reflection surface, and a light guide portion facing the parabolic reflection surface and having a rectangular section. An LED module is disposed at the focal point of the parabolic reflection surface and emitting light to the parabolic reflection surface through the concave portion. A surface of the light guide portion parallel to the light incident surface is stepped from the light incident surface in a direction in which the rectangular section of the light guide portion decreases.

9 Claims, 6 Drawing Sheets

ILLUMINATION UNIT USING LED AND IMAGE PROJECTING APPARATUS EMPLOYING THE SAME

BACKGROUND OF THE INVENTION

This application claims priority from Korean Patent Application No. 10-2004-0076902, filed on Sep. 24, 2004, in the Korean Intellectual Property Office, the disclosure of which is incorporated herein in its entirety by reference.

1. Field of the Invention

The present invention relates to an illumination unit and an image projecting apparatus and, more particularly, to an illumination unit using a light emitting diode (LED) and an image projecting apparatus employing the same.

2. Description of the Related Art

In general, image projecting apparatuses include an illumination unit to illuminate an optical modulation element. A metal halide lamp or a super high pressure mercury lamp are used as a light source of the illumination unit. Since the metal halide lamp and the super high pressure mercury lamp are very large, the illumination unit becomes large accordingly. Also, since the life span of these lamps are several thousands hours at the best, the lamps for home use need to be replaced frequently. To solve the above problems, a study to use a compact light source such as an LED module having a relatively long life span as a light source has been performed.

The LED module generally has a smaller amount of light than the metal halide lamp or the super high pressure mercury lamp. Thus, an LED module array formed by arraying a plurality of LED modules is used as a light source of the image projecting apparatus. A lens is used to condense light, in which an optical efficiency is deteriorated.

Referring to FIGS. 1 and 2, the deterioration of the optical efficiency will be described in detail. The multiplication of the size and angle of an image at a near axis area is preserved. Thus, the multiplication of a light emitting area of the LED module and a solid angle of a light emitting angle becomes the amount of preservation, which is referred to as etendue. As shown in FIG. 1, when a single LED module is to be used, the multiplication of the light emitting area $\Phi_L$ and the solid angle $U_L$ of the LED module can be identical to the multiplication of a light emitting area $\Phi_P$ and the solid angle $U_P$ of the optical modulation element.

When a plurality of LED modules are used in an array, as shown in FIG. 2, a light emitting area $\Sigma\Phi_L$ of the LED module array becomes larger than the light emitting area $\Phi_L$ when a single LED module is used. The light emitting angles $U_L$ of the LED module and the LED module array are identical and the areas $\Phi_P$ of the optical modulation elements therebetween are identical as well. Thus, to preserve etendue, when the LED module array is used, the solid angle $U_P'$ of the light emitting angle of the optical modulation element increases compared to a case of using a single LED module. Since the angle effectively projected by a projection lens is $U_P$, light in a range of an angle greater than $U_P$ cannot be effectively projected by the projection lens. Thus, loss as shown in FIG. 2 is generated to deteriorate the optical efficiency. As a result, an increase in the brightness of the image projecting apparatus is limited although the number of LED modules increases.

SUMMARY OF THE INVENTION

To solve the above and/or other problems, an apparatus consistent with the present invention provides an illumination unit efficiently condensing light emitted from an LED module, and an image projecting apparatus employing the same.

According to an aspect of the present invention, an illumination unit comprises a glass rod including a parabolic reflection surface, a light incident surface facing the parabolic reflection surface, a concave portion formed inwardly in the light incident surface at a position of a focal point of the parabolic reflection surface, and a light guide portion facing the parabolic reflection surface and having a rectangular section, and an LED module disposed at the focal point of the parabolic reflection surface and emitting light to the parabolic reflection surface through the concave portion, wherein a surface of the light guide portion parallel to the light incident surface is stepped from the light incident surface in a direction in which the rectangular section of the light guide portion decreases.

According to another aspect of the present invention, an image projecting apparatus comprises a plurality of illumination units emitting lights of different colors, an optical modulation element sequentially modulating the lights of different colors emitted from the illumination units according to image data, and a projection lens unit magnifying the lights output from the optical modulation element and projecting the magnified lights, wherein each of the illumination units comprises at least one glass rod including a parabolic reflection surface, a light incident surface facing the parabolic reflection surface, a concave portion formed inwardly in the light incident surface at a position of a focal point of the parabolic reflection surface, and a light guide portion facing the parabolic reflection surface and having a rectangular section, and at least one LED module disposed at the focal point of the parabolic reflection surface and emitting light to the parabolic reflection surface through the concave portion, wherein a surface of the light guide portion parallel to the light incident surface is stepped from the light incident surface in a direction in which the rectangular section of the light guide portion decreases.

The concave portion may be a section of a sphere having a center at the focal point of the parabolic reflection surface.

The concave portion is filled with a buffer material having a refractive index between a refractive index of an outside medium and a refractive index of the glass rod to compensate for a difference in refractive index between the glass rod and the outside medium.

The illumination unit further comprises a plurality of glass rods arranged in two dimensions and a plurality of LED modules corresponding to the respective glass rods.

The optical modulation element may be a reflection type optical modulation element.

The optical modulation element may be a transmission type optical modulation element.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 3:
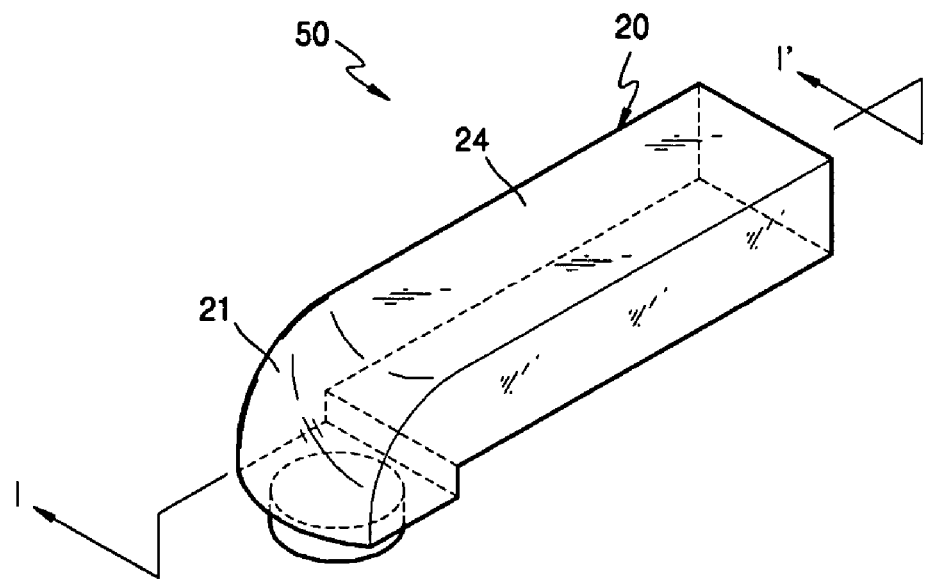
FIG. 3 is a perspective view of an illumination unit according to an exemplary embodiment of the present invention.
Figure 4:
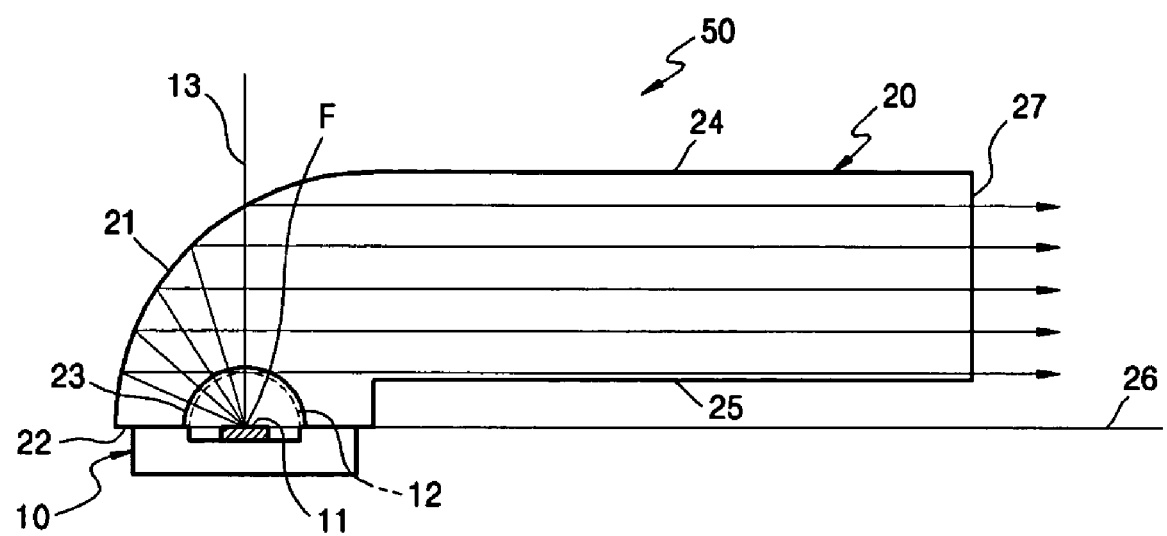
FIG. 4 is a cross-sectional view taken along line I–I' of FIG. 3.

Referring to FIGS. 3 and 4, an illumination unit according to an exemplary embodiment of the present invention includes an LED module 10 and a glass rod 20. The glass rod 20 includes a parabolic reflection surface 21, a light incident surface 22, and a light guide portion 24. The light incident surface 22 faces the parabolic reflection surface 21. The light incident surface 22, for example, can be a surface which includes a principle axis 26 of the parabolic reflection surface 21, is disposed parallel to a plane including the principle axis 26, or is inclined at a predetermined angle with respect to the plane including the principle axis 26. A concave portion 23 is formed at a focal position on the light incident surface 22. The light guide portion 24 is a square pillar having a rectangular section to face the parabolic reflection surface 21 at a position different from the light incident surface 22. A surface 25 parallel to the light incident surface 22 of the light guide portion 24 is stepped above the light incident surface 22, that is, in a direction in which the section of the light guide portion 24 is reduced.

The parabolic reflection surface 21 does not signify only an exact parabolic surface having a conic coefficient K of −1. The parabolic reflection surface 21 described in the present specification signifies an aspheric surface such that K is within a range between −0.4 through −2.5, preferably, but not necessarily, between −0.7 through −1.6. The K value can be appropriately selected within the above range to collimate the light emitted from the LED module 10 in a radiation angle range to effectively illuminate an object. The parabolic reflection surface 21 having the K of −1, for example, will be described below.

The LED module 10 includes the LED chip 11 emitting light. Although not shown in the drawings, a heat radiating body for dissipating heat generated from the LED chip 11 and positive and negative electrodes to provide current to the LED chip 11 are provided on the LED module 10. The LED module 10 can further include a dome lens, or cap, 12. Since the structure of the LED module 10 is well known to those skilled in the art, a detailed description thereof will be omitted herein. The LED module 10 is disposed at a focal point F of the parabolic reflection surface 21. In other words, the LED module 10 is installed such that the LED chip 11 of the LED module 10 is located at the focal point F of the parabolic reflection surface 21. The concave portion 23 provides a space for location of the LED chip 11 at around the focal point F of the parabolic reflection surface 21. As an exemplary embodiment, the concave portion 23 is a section of a sphere such as, for example, a hemisphere, having a center at the focal point F of the parabolic reflection surface 21. Since the LED chip 11 is not a point light source but a surface light source in a strict sense, it cannot be located exactly at the focal point F of the parabolic reflection surface 21. Accordingly, the LED module 10 is disposed at around the focal point F of the parabolic reflection surface 21. In the present embodiment, although the LED module 10 is arranged such that an optical axis 13 is almost perpendicular to the principle axis 26, the present invention is not limited thereto.

The light emitted from the LED chip 11 enters the glass rod 20 via the concave portion 23. The light is reflected by the parabolic reflection surface 21 and collimated as a parallel beam that is almost parallel to the principle axis 26. The light propagates in the light guide portion 24 and exits through the light exit surface 27. The "almost parallel" signifies that the light is not a perfect parallel beam because the LED chip 11 is actually a surface light source so that all of the light is not emitted from the focal point F but from the vicinity of the focal point F.

Figure 1:
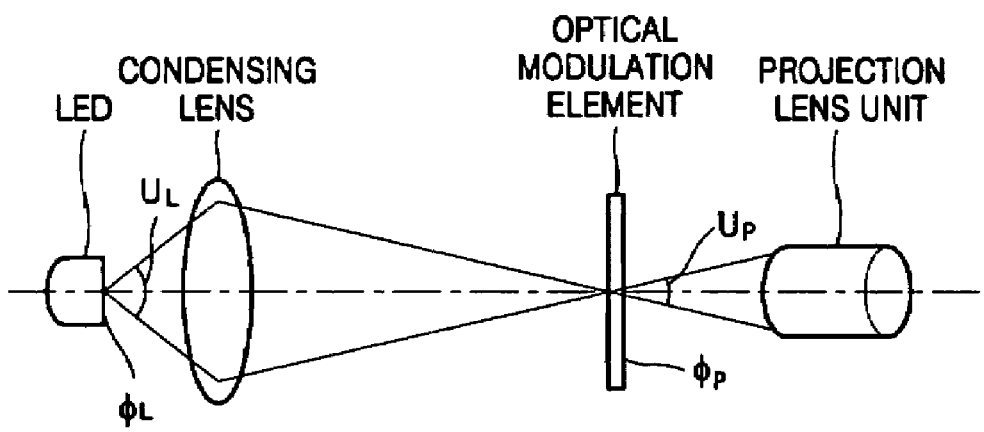
FIGS. 1 and 2 are views for explaining the deterioration of a light use efficiency by a lens.
Figure 2:
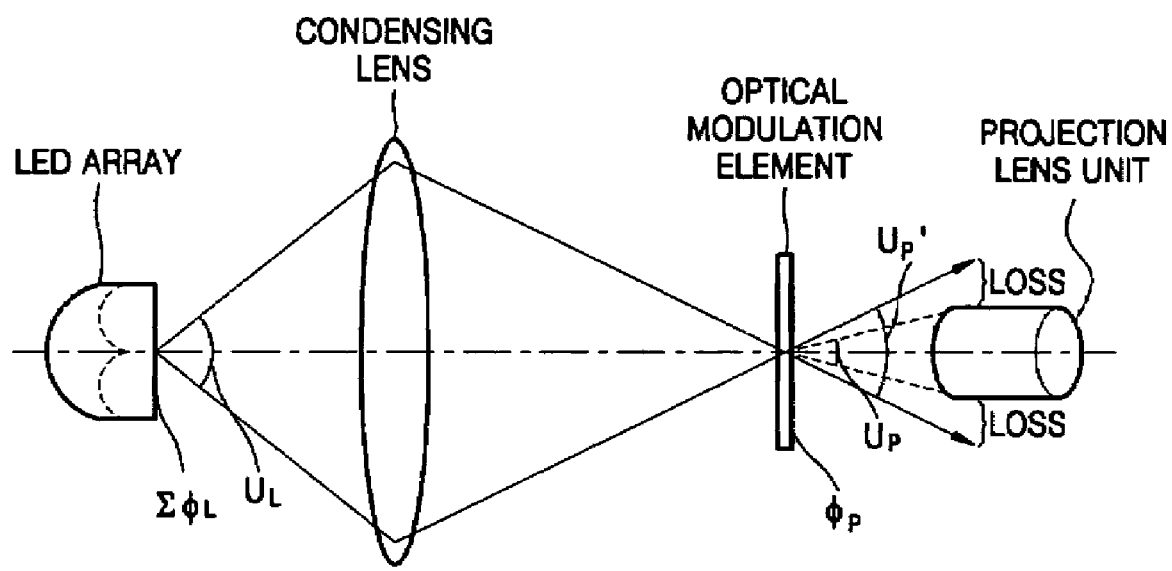
Figure 5:
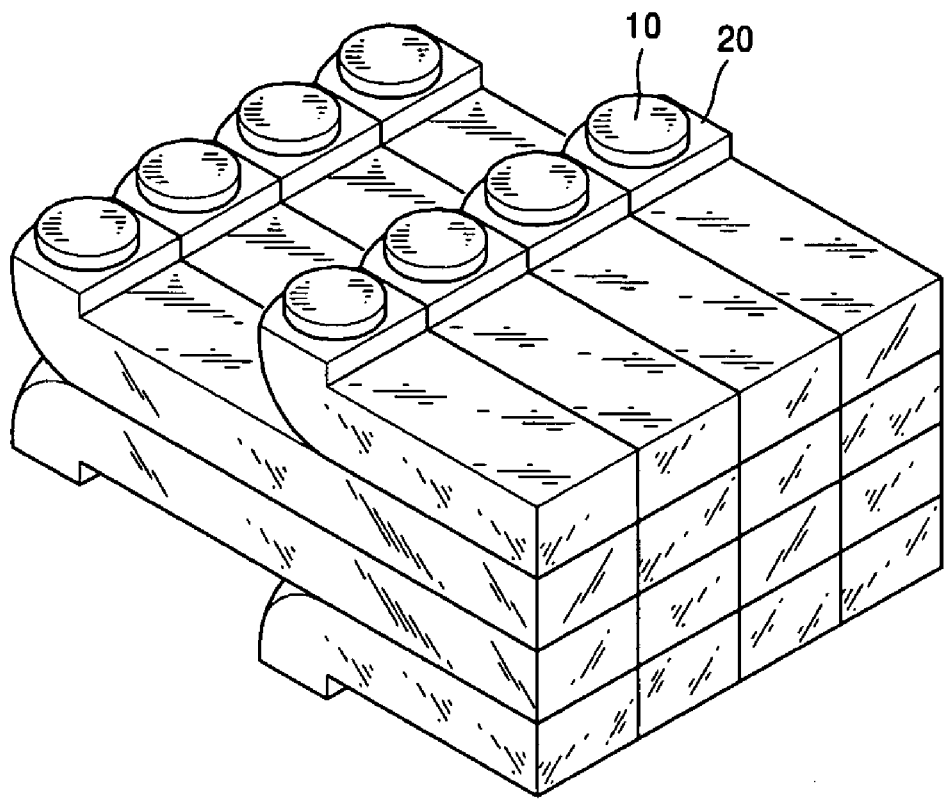
FIG. 5 is a perspective view of an example of the glass rod and the LED array.

Since the light amount of the LED module 10 is generally less than that of a metal halide lamp or a super high pressure mercury lamp, it is constructed in an array when used. Thus, the illumination unit in the present embodiment is constructed in an array, for example, as shown in FIG. 5. In this case, since the light is collimated using the parabolic reflection surface 21 without using a lens, the light can be collimated at a high efficiency without a decrease in the light use efficiency as described with reference to FIGS. 1 and 2.

Figure 6:
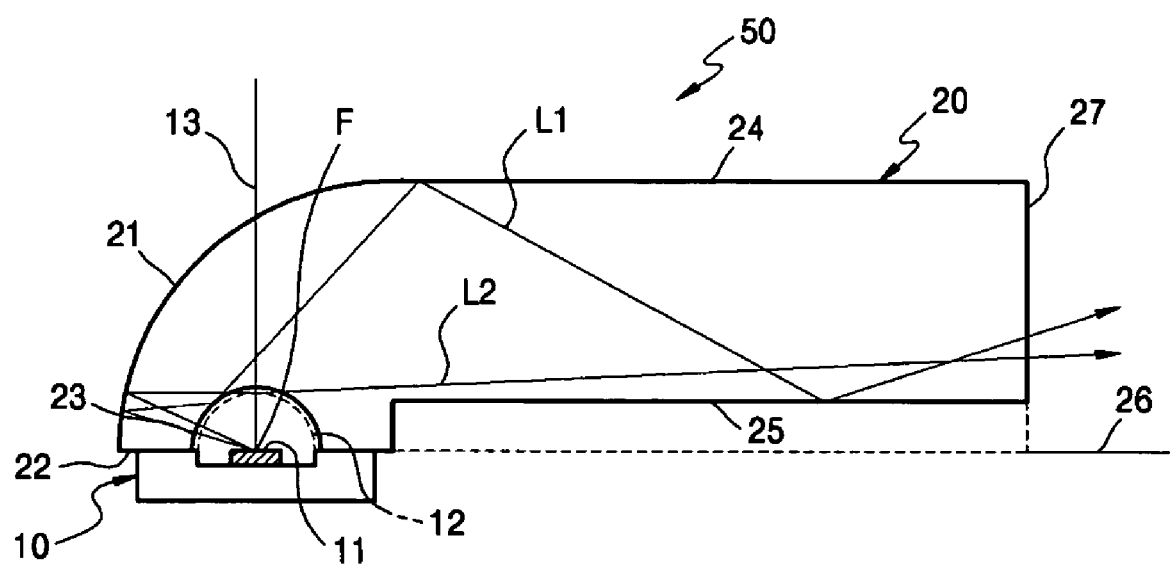
FIG. 6 is a cross-sectional view for explaining the step between the light incident surface and the light guide portion.

FIG. 6 is a cross-sectional view for explaining the step between the light incident surface and the light guide portion. Referring to FIG. 6, lights L1 and L2 that are parts of the light emitted from the LED module 10 can proceed toward the concave portion 23 after being reflected by the parabolic reflection surface 21. These lights are reflected by the concave portion 23 due to a difference in the refractive index between the glass rod 20 and the outside medium or transmit the concave portion 23. Accordingly, the light amount is reduced.

Figure 7:
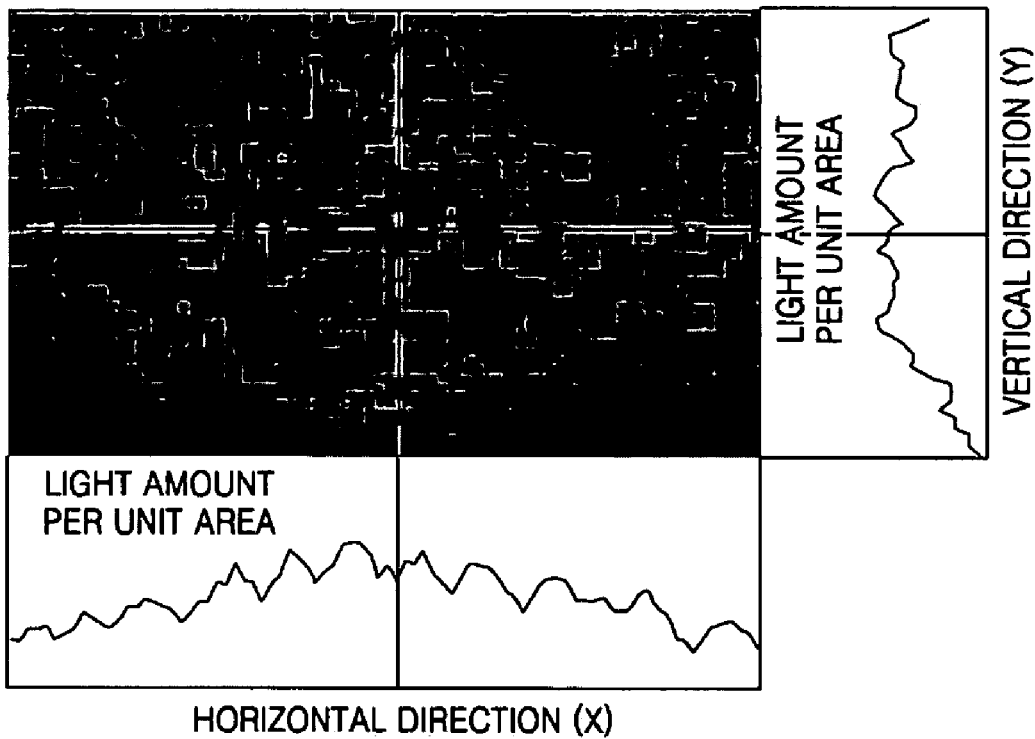
FIG. 7 is a graph showing the distribution of the light amount at the light exit surface when there is no step between the light incident surface and the light guide portion.

FIG. 7 shows a result of the measurement of the distribution of the light amount when the surface 25 of the light guide portion 24 extends from and is parallel to the light incident surface 22 as indicated by a dotted line in FIG. 6 (i.e., without a step). Referring to FIG. 7, while the distribution of the light amount in a horizontal direction X is concentrated at a center portion of the light exit surface 27 which is a preferable distribution, in the vertical direction Y, the distribution of the light amount is slightly deviated upward from the center of the light exit surface 27. When the distribution of the light amount is deviated from the center of the light exit surface 27 as above, a high light use efficiency is difficult to realize when a plurality of illumination units are to be arrayed.

Figure 8:
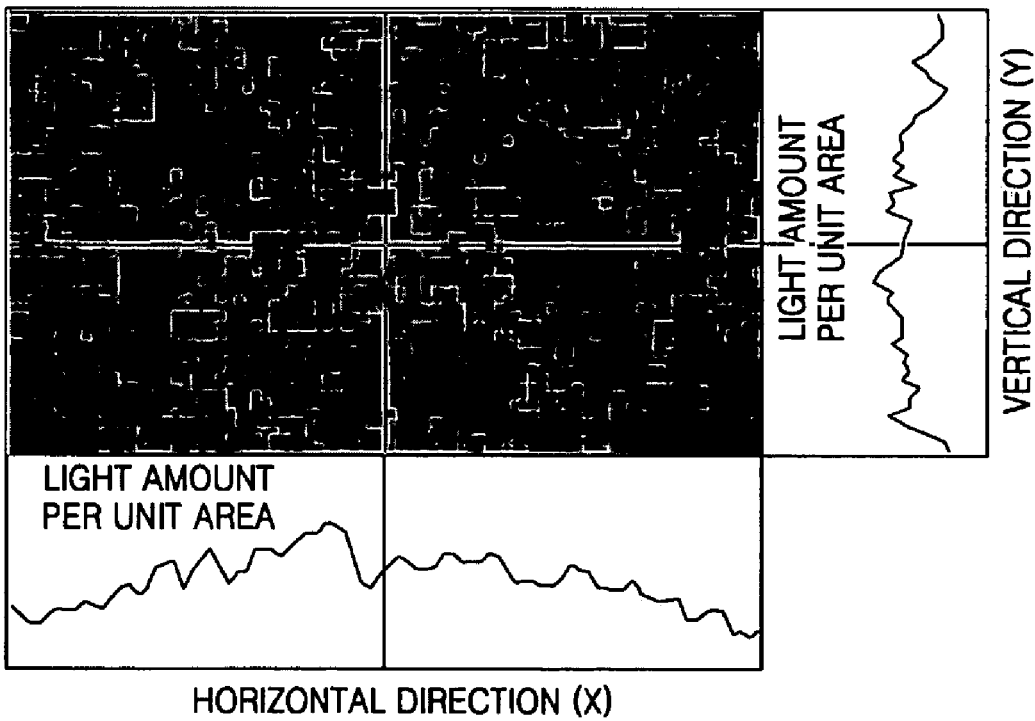
FIG. 8 is a graph showing the distribution of the light amount at the light exit surface when there is a step between the light incident surface and the light guide portion.

Thus, as shown in FIG. 4, the surface 25 of the light guide portion 24 employed in the illumination unit 50 in the present embodiment is stepped above the light incident surface 22. As a result, as shown in FIG. 8, the distribution of the light amount in the horizontal and vertical directions X and Y on the light exit surface 27 is concentrated on the center of the light exit surface 27. Considering the shape and size of the concave 23, the amount of the step between the light incident surface 22 and the surface 25 of the light guide portion 24 can be appropriately adjusted to obtain the distribution of the light amount at the light exit surface 27 as shown in FIG. 8.

The concave portion 23 can be filled with a buffer material. For example, when the LED chip 11 of the LED module 10 is an exposed type without the dome lens, or the cap, 12, air is interposed between the glass rod 20 and the LED chip 11. When the light emitted from the LED chip 11 is incident on the glass rod 20, the light is refracted at a boundary surface due to a difference in the refractive index between the air and the glass rod 20. As a result, the position where the light is emitted is deviated from the focal point F of the parabolic reflection surface 21, an efficiency in collimating is deteriorated. The buffer material is to compensate for the difference in the refractive index between the glass rod 20 and the outside medium, for example, air. The refractive index of the buffer material is preferably, but not necessarily, between the refractive indexes of the glass rod 20 and the air. When the LED module 10 has the dome lens, or the cap, 12, the refractive index of the buffer material is preferably, but not necessarily, between the refractive indexes of the dome lens, or the cap, 12 and the glass rod 20.

An image projecting apparatus employing the illumination unit 50 according to the present invention will be described below.

Figure 9:
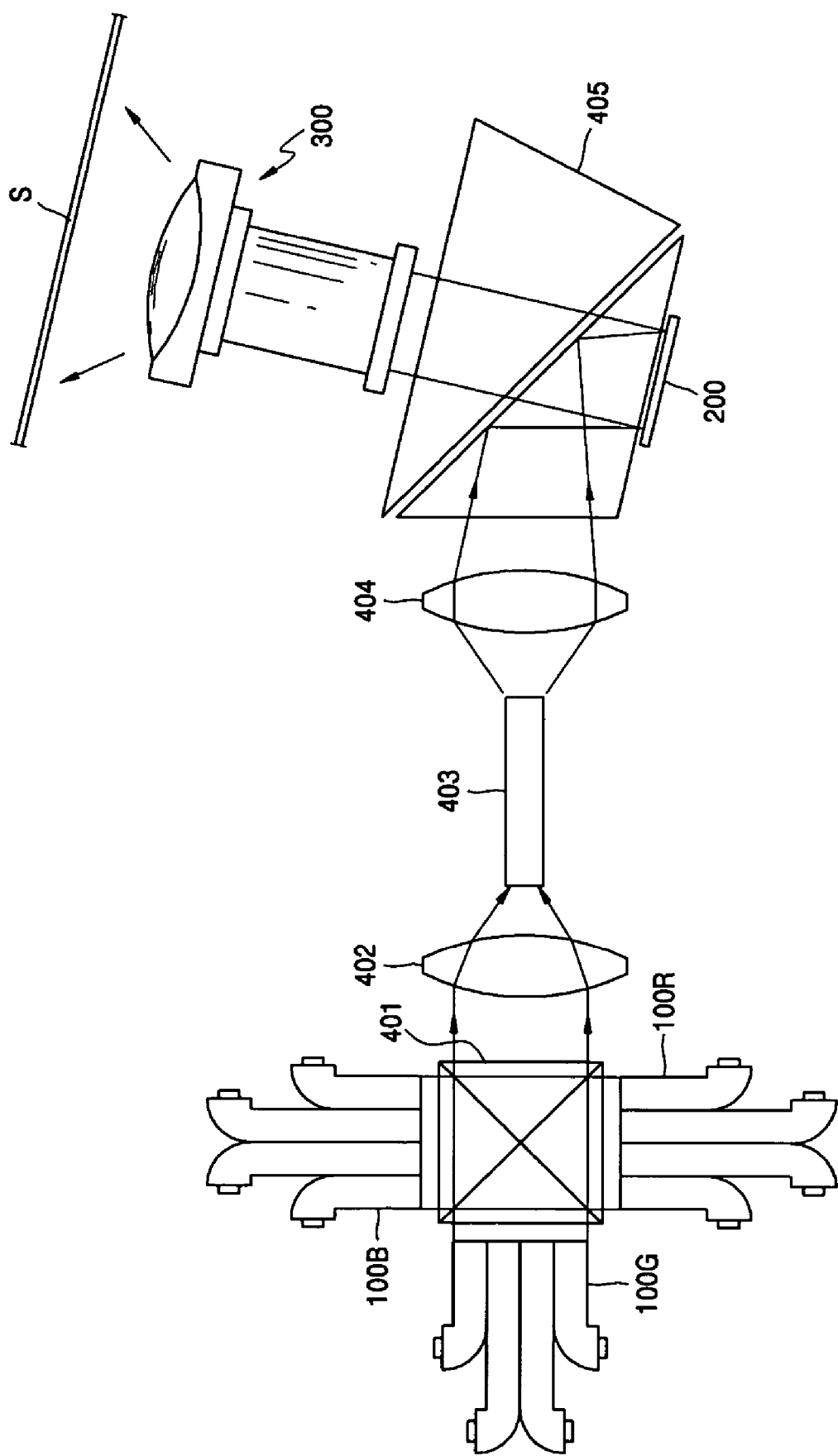
FIG. 9 is a view illustrating an image projecting apparatus according to an exemplary embodiment of the present invention.

FIG. 9 is a view illustrating an image projecting apparatus according to an exemplary embodiment of the present invention. Referring to FIG. 9, the image projecting apparatus includes illumination units 100R, 100G, and 100B, an optical modulation element 200, and a projection lens unit 300. The illumination units 100R, 100G, and 100B emit red (R), green (G), and blue (B) lights, respectively. Each of the illumination units 100R, 100G, and 100B includes, for example, sixteen illumination units which are arrayed as shown in FIG. 5. The optical modulation element 200 sequentially modulates the red (R), green (G), and blue (B) lights sequentially emitted from the illumination units 100R, 100G, and 100B, according to image data. In the present embodiment, the image projecting apparatus is a single panel type image projecting apparatus using a single reflection type optical modulation element 200. For example, a digital micromirror device (DMD) can be used as the optical modulation element 200.

The red (R), green (G), and blue (B) lights sequentially emitted from the illumination units 100R, 100G, and 100B, respectively, are guided by an X-cube prism 401 into an optical path in common and incident on an integrator 403. The integrator 403 forms a surface light having uniform light intensity. A glass rod having a rectangular section or a light tunnel having an inner reflection surface can be used as the integrator 403. A condensing lens unit 402 condenses light to be incident on the integrator 403. The light output from the integrator 403 passes a total internal reflection (TIR) prism 405 and is incident on the optical modulation element 200. A relay lens unit 404 magnifies or reduces the light output from the integrator 403 according to the aperture of the optical modulation element 200. The optical modulation element 200 sequentially modulates the red (R), green (G), and blue (B) lights corresponding to image information. The modulated lights are guided toward the projection unit lens 300 by the TIR prism 405. The projection lens unit 300 magnifies the modulated lights and projects the magnified lights onto a screen S.

Figure 10:
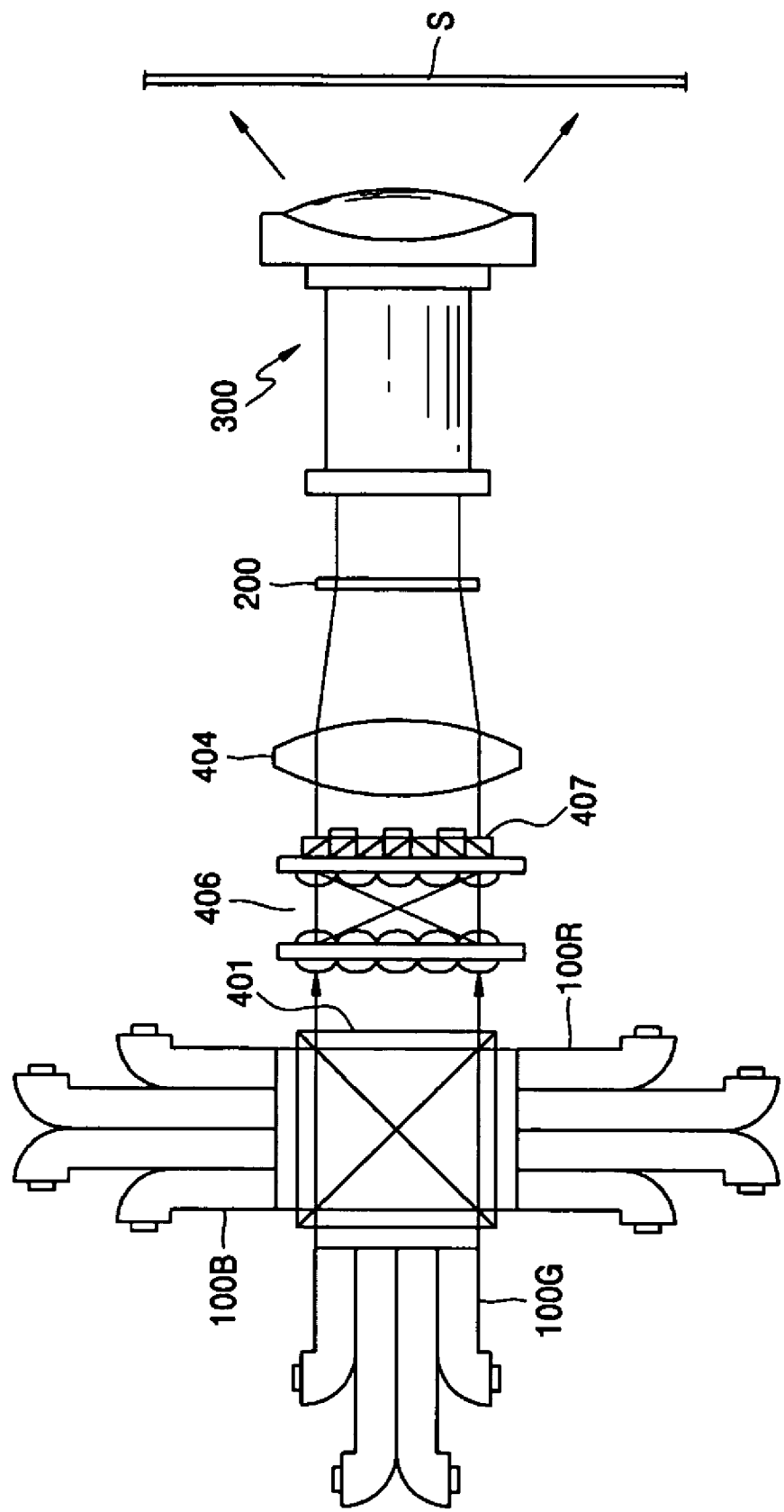
FIG. 10 is a view illustrating an image projecting apparatus according to another exemplary embodiment of the present invention.

FIG. 10 is a view illustrating an image projecting apparatus according to another exemplary embodiment of the present invention. Referring to FIG. 10, the image projecting apparatus includes the illumination units 100R, 100G, and 100B, the optical modulation element 200, and the projection lens unit 300. The illumination units 100R, 100G, and 100B emit red (R), green (G), and blue (B) lights, respectively. Each of the illumination units 100R, 100G, and 100B includes, for example, sixteen illumination units which are arrayed as shown in FIG. 5. The optical modulation element 200 sequentially modulates the red (R), green (G), and blue (B) lights sequentially emitted from the illumination units 100R, 100G, and 100B, according to image data. In the present embodiment, the image projecting apparatus is a single panel type image projecting apparatus using a single transmission type optical modulation element 200. For example, an LCD panel can be used as the optical modulation element 200.

The red (R), green (G), and blue (B) lights sequentially emitted from the illumination units 100R, 100G, and 100B, respectively, are guided by an X-cube prism 401 into an optical path in common and incident on a fly-eye lens 406. The fly-eye lens 406 performs the same function as the integrator 403 and forms a surface light having uniform light intensity. The LCD panel used as the transmission type optical modulation element 200 transmits light having a particular polarization. The fly-eye lens 406 used as the transmission type optical modulation element 200 transmits light having a particular polarization. A polarization changer 407 changes the light passing the fly-eye lens 406 to have a polarization direction so as to pass the LCD panel. The light passing the polarization changer 407 is incident on the optical modulation element 200. The relay lens unit 404 magnifies or reduces the light emitted from the polarization changer 407 according to the aperture of the optical modulation element 200. The optical modulation element 200 sequentially modulates the red (R), green (G), and blue (B) lights corresponding to image information. The modulated lights are guided by the projection lens unit 300 and the projection lens unit 300 magnifies the modulated lights and projects the magnified lights onto the screen S.

According to the above-described image projecting apparatus, by employing the LED module 10 as a light source, the life span of the illumination units 100R, 100G, and 100B can be extended. Also, by collimating the light emitted from the LED module 10 without using a lens, an efficiency in using light is improved so that brightness of the image projecting apparatus can be improved. Furthermore, by including the illumination units 100R, 100G, and 100B employing the LED module 10, the image projecting apparatus can be made compact.

As described above, according to the image projecting apparatus according to the present invention, the following effect can be obtained.

Since light is collimated using a parabolic reflection surface without using a lens, the light can be collimated at a high efficiency without reduction in the light use efficiency due to the lens and the brightness of the image projecting apparatus is improved. Also, since an LED module is used as a light source, the image projecting apparatus can be made compact and long life span thereof is made possible.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An illumination unit comprising:
  a glass rod including a parabolic reflection surface, a light incident surface facing the parabolic reflection surface, a concave portion formed inwardly in the light incident surface at a position of a focal point of the parabolic reflection surface, and a light guide portion facing the parabolic reflection surface and having a rectangular section; and an LED module disposed at the focal point of the parabolic reflection surface and emitting light to the parabolic reflection surface through the concave portion, wherein a surface of the light guide portion parallel to the light incident surface is stepped from the light incident surface in a direction in which the rectangular section of the light guide portion decreases.

2. The illumination unit as claimed in claim 1, wherein the concave portion is a section of a sphere having a center at the focal point of the parabolic reflection surface.

3. The illumination unit as claimed in claim 1, wherein the concave portion is filled with a buffer material having a refractive index between a refractive index of an outside medium and a refractive index of the glass rod to compensate for a difference in refractive index between the glass rod and the outside medium.

4. The illumination unit as claimed in claim 1, further comprising a plurality of glass rods arranged in two dimensions and a plurality of LED modules corresponding to the respective glass rods.

5. An image projecting apparatus comprising:
a plurality of illumination units emitting lights of different colors;
an optical modulation element sequentially modulating the lights of different colors emitted from the illumination units according to image data; and
a projection lens unit magnifying the lights output from the optical modulation element and projecting the magnified lights, wherein each of the illumination units comprises:
at least one glass rod including a parabolic reflection surface, a light incident surface facing the parabolic reflection surface, a concave portion formed inwardly in the light incident surface at a position of a focal point of the parabolic reflection surface, and a light guide portion facing the parabolic reflection surface and having a rectangular section; and
at least one LED module disposed at the focal point of the parabolic reflection surface and emitting light to the parabolic reflection surface through the concave portion, wherein a surface of the light guide portion parallel to the light incident surface is stepped from the light incident surface in a direction in which the rectangular section of the light guide portion decreases.

6. The image projecting apparatus as claimed in claim 5, wherein the concave portion is a section of a sphere having a center at the focal point of the parabolic reflection surface.

7. The image projecting apparatus as claimed in claim 5, wherein the concave portion is filled with a buffer material having a refractive index between a refractive index of a final light transmitting material and a refractive index of the glass rod to compensate for a difference in refractive index between the final light transmitting material and the glass rod.

8. The image projecting apparatus as claimed in claim 5, wherein the optical modulation element is a reflection type optical modulation element.

9. The image projecting apparatus as claimed in claim 5, wherein the optical modulation element is a transmission type optical modulation element.

* * * * *